United States Patent
Hargrove et al.

(10) Patent No.: US 8,822,566 B2
(45) Date of Patent: Sep. 2, 2014

(54) NON-HOMOGENEOUS READY-MIX JOINT COMPOUND

(75) Inventors: Pamela L. Hargrove, Cary, IL (US); Richard B. Stevens, Village of Lakewood, IL (US)

(73) Assignee: United States Gypsum Company, Chicago, IL (US)

(*) Notice: Subject to any disclaimer, the term of this patent is extended or adjusted under 35 U.S.C. 154(b) by 42 days.

(21) Appl. No.: 13/335,130

(22) Filed: Dec. 22, 2011

(65) Prior Publication Data

US 2012/0165426 A1 Jun. 28, 2012

Related U.S. Application Data

(60) Provisional application No. 61/426,766, filed on Dec. 23, 2010.

(51) Int. Cl.
- *C08K 5/22* (2006.01)
- *C08K 5/06* (2006.01)
- *C09D 5/34* (2006.01)
- *C04B 40/00* (2006.01)
- *C04B 26/02* (2006.01)
- *E04F 13/02* (2006.01)
- *C04B 111/00* (2006.01)

(52) U.S. Cl.
CPC . *C09D 5/34* (2013.01); *E04F 13/02* (2013.01); *C04B 2111/00681* (2013.01); *C04B 40/0039* (2013.01); *C04B 26/02* (2013.01)

USPC .................. 523/122; 524/156; 524/366

(58) Field of Classification Search
USPC ............. 523/122; 524/35, 158, 425, 156, 366
See application file for complete search history.

(56) References Cited

U.S. PATENT DOCUMENTS

| | | |
|---|---|---|
| 4,454,267 A | 6/1984 | Williams |
| 4,525,388 A | 6/1985 | Rehder et al. |
| 5,336,318 A | 8/1994 | Attard et al. |
| 5,558,708 A | 9/1996 | Johansen, Jr. et al. |
| 5,728,209 A | 3/1998 | Bury et al. |
| 6,348,093 B1 | 2/2002 | Rieder et al. |
| 6,476,099 B1 * | 11/2002 | Cimaglio et al. ............. 523/218 |
| 6,481,171 B2 | 11/2002 | Yu et al. |
| 6,545,066 B1 | 4/2003 | Immordino, Jr. et al. |
| 6,673,144 B2 | 1/2004 | Immordino, Jr. et al. |
| 6,884,830 B1 | 4/2005 | Hornaman |
| 7,270,233 B2 | 9/2007 | Kindt |
| 7,754,006 B2 | 7/2010 | Liu et al. |
| 2008/0087199 A1 | 4/2008 | Gartner |
| 2009/0011207 A1 | 1/2009 | Dubey |

* cited by examiner

*Primary Examiner* — Kriellion Sanders
(74) *Attorney, Agent, or Firm* — Greer, Burns & Crain, Ltd.; Pradip Sahu; Philip T. Petti

(57) ABSTRACT

A wallboard joint compound includes a base joint compound having a homogeneous, paste-like blend of water and at least one of a filler, a binder, a thickener, a suspending agent, a biocide, a preservative, a mineral filler and expanded perlite; and an additive discretely added to the base joint compound to be available for use once mixed into the base joint compound just prior to application of the wallboard joint compound by a user.

17 Claims, No Drawings

NON-HOMOGENEOUS READY-MIX JOINT COMPOUND

RELATED APPLICATION

This application claims priority under 35 USC 119(e) from U.S. Provisional Ser. No. 61/426,766 filed Dec. 23, 2010.

FIELD OF THE INVENTION

This invention relates to a ready-mix joint compound. More specifically, it relates to a joint compound with enhanced performance and/or enhanced appearance or improved manufacturing through use of a non-homogeneous ready mix composition.

BACKGROUND

Walls and ceilings made from gypsum wallboard panels are conventionally constructed by attaching the wallboard panels to framing members or studs, and filling and coating the joints between the panels with a specially formulated paste composition called a joint compound. Joint compounds may be supplied as powdered compositions (to be mixed with water at the jobsite) or may be premixed with water at the factory to yield a ready mixed (or paste) joint compound. A paste joint compound (Taping grade) is placed within and over the joint formed by the abutting edges of the wallboard panels, and a paper reinforcing tape is embedded in the joint with the joint compound which is then permitted to dry. Alternately, the reinforcing tape may be of non-cellulose composition, but of a size and shape similar to strips of paper joint tape. Alternately, the reinforcing tape may be of a fiberglass weave requiring the use of chemically setting type joint compounds. When the joint compound is dry, a second joint compound (Topping or Finishing grade) is applied over the joint, and it too is permitted to dry. It is usually necessary for a third application of a joint compound and, after the third coat is dry, it may be lightly sanded and may be conventionally finished with a decorative material (paint, texture or wallpaper) then applied to the wall. All three coats of joint compound may alternately be done with an All Purpose grade of joint compound. Ready mixed joint compound is typically supplied to the customer in either cardboard cartons or plastic pails in units having volumes of 3.5 to 4.5 gallons (13.25-17.03 L). Joint compound is supplied at a viscosity typically higher than what is applied at the jobsite. This allows the contractor to mix in additional water using a power drill and mixing paddle to achieve the desired application viscosity.

Ready Mix joint compound production is typically accomplished by blending the wet and dry ingredients in a mixer until smooth, adjusting the viscosity to a desired level through water addition, then filling and sealing containers to be shipped to customers. This process can be disrupted by use of ingredients which thicken very rapidly and take longer periods of time to fully wet out and drop in viscosity, leaving the combined wet and dry ingredients in the mixer competing for water through the typical mixing cycle and at a higher than desired viscosity. The above process results in mechanical limitations and problems such as binding of the wet mixer and overloading of the mixer motor. The higher than desired viscosity at the completion of the mixing cycle affects the ease of pumping and moving the material out of the mixing system and through the packaging line and also interferes with the lidding and closing of the container. Thus, there are mechanical limitations on the types of raw materials that can be used within a typical wet mixing system for manufacturing ready mix.

U.S. Pat. No. 6,476,099, incorporated by reference, discloses the addition of surfactant additives to joint compound to generate performance with reduced cracking, reduced shrinkage and reduction of surface finish defects after application to wallboard and other panel surfaces. The preferred surfactant additive was identified as sodium dodecylbenzene sulfonate (DDBSA). It has been found that a significant disadvantage and limitation for the use of DDBSA is that the joint compound will develop an extremely frothy and spongy appearance after the joint compound is packaged. The degraded appearance of the DDBSA modified ready mix joint compound can limit product acceptance by applicators upon opening the packaging, however product performance is excellent following remixing, which temporarily redisperses and reduces the size of the spongy, frothy air bubbles. Remixing is a standard practice by applicators to homogenize the joint compound and break down any gel or yield value, while adding water to reduce the viscosity of the joint compound to a point preferred for their current step in joint finishing process. Remixing and thinning is accomplished using a powerful drill and mixing paddle.

SUMMARY

Ready mix joint compounds are provided that potentially generate rapid and strong thickening and offer performance improvements while their use does not cause severe operating limitations. Also, the present joint compounds provide for the utilization of the DDBSA surfactant additive without the detriment of the spongy, frothy nature of the joint compound remaining undisturbed in the carton or pail. The present joint compound provides a system that offers a way to incorporate raw materials that offer desired performance in ready mixed joint compound but are typically very difficult to incorporate during manufacturing or present problems in storage of the joint compound package.

Ready mix joint compounds are currently manufactured by a homogeneous blending of ingredients with water in a mixer to create a paste which is then packaged and sold as a single component. A different approach is used for manufacturing joint compounds prepared in accordance with this disclosure. A homogeneous blending of most of the ingredients of the present joint compound is accomplished in a mixer to create a paste which is then dispensed into packaging. Before the package is sealed, specific ingredients are injected or added into the ready mix matrix and not further blended. Thus, the specific ingredients, referred to as additives, remain "discretely added" in the base joint compound. In the present application, "discretely added" means that the additive is mechanically inserted or injected into the base compound and remains non-homogeneously mixed in the base compound until the user mixes it into the base joint compound. There may be some slight mixing of the additive at its periphery where it contacts the base compound prior to the user activation described above. However, until then, and aside from a slight peripheral mixing, the additive retains its integrity within the base joint compound. There are some ingredients that are desirable to use as they add a benefit to the product performance which are known to render the composition excessively difficult to manufacture or negatively affect the product appearance after aging. In the present system, applicators at the jobsite will re-disperse the non-homogeneous ready mix with a power drill and paddle. This is done during their normal water addition to achieve the desired lower application viscosity. In this way, the performance advantages gained by using a particular additive can be achieved without realizing the difficulties or limitation in manufacturing or negative impact on product appearance.

More specifically, a wallboard joint compound is provided that includes a base joint compound comprising a homogeneous, paste-like blend of water and at least one of a filler, a binder, a thickener, a suspending agent, a biocide, a preservative, a mineral filler and expanded perlite; and an additive discretely added to the base joint compound to be available for use once mixed into the base joint compound just prior to application of the wallboard joint compound by the end user.

In another embodiment, a method of preparing a wallboard joint compound, includes forming a base joint compound by combining water and a filler, a thickener and a binder, mixing the base joint compound to form a homogeneous blend, and injecting a surfactant additive into the base joint compound so that the additive is dispersed in the base joint compound just prior to use of the wallboard joint compound.

DETAILED DESCRIPTION

Preparation of the base joint compound, also referred to as the base compound, incorporates a filler, a binder, a thickener, preservatives, a non-leveling agent and water as commonly understood by those well skilled in the art. Lightweight filler may be optionally included into the base compound to adjust the density of the composition.

Filler for use in the base joint compound may be any of the calcium carbonate or calcium sulfate dihydrate fillers common to preparation of typical joint compounds and known to those skilled in the art. Fillers ground to median particle size between 5 and 40 microns are typically used. Usage levels are typically between 50% to 95% by weight of the total composition ingredients not including the water added (a dried component basis), although example of filler-free compounds do exist.

A latex emulsion binder is an important ingredient which is well known to those skilled in the joint compound art and may comprise some or all of the binder of the invention. Any of the conventional latex binders may be used, with polyvinyl acetate and ethylene vinyl acetate emulsions being preferred. If present, the latex binder ranges from about 0.5% to about 10% by weight of the composition prior to adding water, with some embodiments using 1% to about 8% (by weight on a dried component basis). The use of spray-dried binders is contemplated with usages ranging from 0.1% to 1.5% (by weight on a dried component basis).

It is generally preferred that the base joint compound include one or more thickeners. Conventional cellulosic thickeners, e.g. ethylhydroxy ethylcellulose, hydroxypropyl methylcellulose, methylhydroxypropyl cellulose, hydroxyethyl cellulose, methylhydroxyethyl cellulose and mixtures thereof, may be used in the present base joint compounds. The total amount of cellulosic thickener ranges from about 0.1% to about 3%, preferably 0.3 to 1% by weight of the total composition ingredients not including the water added. It is contemplated that other thickeners will be used instead of or in addition to the cellulosic thickener.

The present base joint compound optionally contains a non-leveling agent or suspending agent such as attapulgus clay. This ingredient provides non-leveling or anti-sag, slip, water retention, and water demand. In general, the amount of the non-leveling agent, if present, ranges from about 1% to about 10%, preferably 2% to 7% by weight of the base composition prior to adding water. Other clays such as sepiolite, bentonite and montmorillonite may also be used in the base joint compound, in addition to or instead of the clay. Non-clay non-leveling or suspending agents such as the types listed in U.S. Pat. No. 5,336,318, incorporated by reference, are of use in the present joint compound.

When preparing a ready-mix joint compound, it is preferable to provide for control of microbial growth in the wet medium during storage. One method of reducing microbes is by introducing a biocide that kills on contact. Examples of contact-kill biocides include household bleach (6% aqueous sodium hypochlorite) or chemicals for shock treatment of swimming pools, such as lithium or calcium hypochlorite. Although these additives will kill essentially all microbes present in the joint compound base at the time of manufacture, they will not prevent future microbial growth.

Conventional in-can preservatives, including MERGAL 174 liquid bactericide made by Troy Corporation, Florham Park, N.J. and/or NUOSEPT 91 liquid organic biocide are available from International Specialty Products, Wayne, N.J, are used for continuing suppression of microbial growth. They can be used in combination with or in place of the contact-kill treatments. Combinations of preservatives are also contemplated.

Water is added in amounts selected to produce a base joint compound of a desired viscosity. Some embodiments of the invention typically target a viscosity of between 200-800 Brabender Units using a pin type probe (Type A) and 250 cmg torque head using a Brabender Viscocorder.

If the joint compound is preferred to be a lightweight, ready-mixed joint compound, the lightweight or low density property can be provided by incorporating an expanded perlite into the base joint compound in accordance with the disclosure in U.S. Pat. No. 4,454,267, incorporated by reference. It is well known in the art that it is preferred that the expanded perlite should have a particle size which will pass through a 100 mesh screen if it is to be incorporated into a joint compound base. In a ready-mixed joint compound, the expanded perlite is optionally treated to render it water-insensitive or left uncoated. If it is advantageous to treat the expanded perlite, there are several ways to render the expanded perlite water-insensitive, one of which is disclosed in U.S. Pat. No. 4,525,388, incorporated by reference. Another method is to treat the expanded perlite with a silicone or siloxane compound, but other materials may be used to render it water-insensitive (i.e., water-repellent). Specially treated expanded perlite is commercially available from suppliers such as Silbrico Corporation, Hodgkins, Ill.

To achieve the desired lightweight properties, the expanded perlite should be present in amounts of at least about 1% by weight of all of the ingredients in the compound, excluding the water. It is particularly preferred that the expanded perlite be present in amounts between about 5% and about 10% by weight of all of the ingredients in the joint compound, excluding the water.

Conventional ready-mixed joint compounds frequently contain mineral fillers, such as diatomaceous earth, mica, talc, or sericite to provide reduced cracking and shrinkage, and added slip. When used in the present base joint compound, the mica or talc may be between about 2% and about 15% by weight of the composition excluding water.

Additional ingredients frequently used in joint compounds are contemplated for use in the present joint compound system. These ingredients optionally include, but are not limited to humectants, fillers, wetting agents, kaolin, defoamers and plasticizers which are also useful in the joint compound base or in the additive blends.

Polyethylene oxide such as the POLYOX polyethylene oxide water-soluble resin product line from Dow Chemical Company, Midland, Mich., is a useful additive for increased viscosity and lubricity. Usage levels are typically 0.05 to 1% by weight of the composition excluding water. This additive is preferably applied as a discrete entity into the base joint compound.

It is contemplated to include a pigment into the water slurry of the preferred surfactant DDBSA. In the present application, "DDBSA" is understood to mean a surfactant additive consisting essentially of a hydrocarbon substituted sulfate, sulfonate, sulfuric acid or sulfonic acid, wherein said hydrocarbon is an aliphatic, olefinic, alicyclic or aromatic group, or combinations thereof, having from 12 to 24 carbon atoms. The pigment, preferably added to the discrete component of the base joint compound, provides a visual indicator that the DDBSA surfactant slurry has been uniformly distributed and dispersed during the drill mixing process. Pigments such as MAPICO Yellow iron oxide from Rockwood Pigments, NA, Inc., Beltsville, Md. are suitable for this purpose.

Example 1

The use of certain polyethylene oxide additives improves joint compound performance by adding lubricity and open time to the joint compound; however the inclusion of these materials into a homogeneous blend presents severe mixing problems when blended with water and other components in a mixer to create a homogeneous ready mix base joint compound paste. Rapid and severe thickening of the polyethylene oxide additives can slow, strain and damage mixing motors and bind mixers. A second limitation as part of this example is the severe structuring that occurs immediately after the blending of the additive with the other components of the ready mix. The severe gel or structuring of the paste prevents the product leveling in the container as the container is filled, resulting in a cone of joint compound extending above the walls of the container interfering with the closing of the containers. Use of this invention to change the process for addition of the polyethylene oxide into a non-homogeneously blended ready mix already contained within its packaging allows for the inclusion of this beneficial raw material while avoiding the problems encountered during manufacturing and packaging.

EXAMPLE 1, TABLE 1
COMPOSITION OF NON-HOMOGENEOUS READY-MIX JOINT COMPOUND USING POLYETHYLENE OXIDE

| Ingredients: | Compound A Homogeneous Blend (grams) | Compound B Non-Homogeneous Blend (grams) |
|---|---|---|
| HUBERCARB M200 (calcium carbonate) | 1828 | 1828 |
| SILBRICO 43-23 (expanded perlite) | 45 | 45 |
| MINUGEL FG hydrous magnesium aluminum silicate (attapulgite clay) | 75 | 75 |
| METHOCEL 240S hydroxypropyl methyl cellulose (cellulosic thickener) | 10 | 10 |
| CELLOSIZE QP52000H hydroxyethyl cellulose | 3 | 3 |
| HALLTECH HP41-830 vinyl acetate emulsion (latex binder emulsion) | 65 | 65 |
| NUOSEPT 91 liquid organic biocide (preservative) | 2 | 2 |
| Water | 1100 | 1000 |
| POLYOX WSR Coagulant (polyethylene oxide) | 0.5 (mixed with rest of ingredients at time of blending with water and mixing of batch) | 0.5 (post-added into the finished batch) |

HUBERCARB M200 calcium carbonate filler is sold by Huber Engineered Materials, Atlanta, Ga. MINUGEL FG hydrous magnesium aluminum silicate is an attpulgite clay filler or binder and is made by Active Minerals International, LLC, Hunt Valley, Md. METHOCEL 240S hydroxypropyl methyl cellulose with delayed solubility is produced by Dow Chemical Co., Midland, Mich. CELLOSIZE QP52000H hydroxyethyl cellulose thickener is obtained from Dow Chemical Co., Midland Mich. HALLTECH HP 41-830 vinyl acetate emulsion is made by Halltech, Inc. (Ontario, Canada). NUOSEPT 91 is a water soluble, liquid organic biocide available from International Specialty Products, Wayne, N.J. POLYOX WSR Coagulant polyethylene oxide is a water soluble resin from Dow Chemical Co., Midland, Mich.

For the above compositions, the joint compound base was made by weighing the dry components and combining them in a vessel. Water was weighed and placed into a second vessel. The remaining wet ingredients were also weighed and added to the water, the wet ingredients including the latex emulsion and preservatives. The combined ingredients were mixed until smooth. For the present examples, the target viscosity was 500 BU. The polyethylene oxide component in Compound A (Example 1, Table 1) was included with the rest of the ingredients as they were blended and mixed. Compound A was then packaged and sealed. The mixing process for Compound B was the same as for Compound A, except for the exclusion of the polyethylene oxide from the initial mixing process. Following completion of the blending and mixing of Compound B (without the polyethylene oxide component), the compound was packaged into containers, and then the polyethylene oxide was added into a pocket made below the surface of the Compound B within the same package. The joint compound then slumped and closed over the trough filled with the polyethylene oxide and then the containers were sealed.

EXAMPLE 1, TABLE 2
PERFORMANCE DATA FOR NON-HOMOGENEOUS READY-MIX JOINT COMPOUND USING POLYETHYLENE OXIDE

| | Compound A Homogeneous Blend | Compound B Non-Homogeneous Blend |
|---|---|---|
| Peak Motor Load during initial mixing | 405 watts | 173 watts |
| Water Usage During Manufacture | 1100 grams | 1000 grams |
| Viscosity during package filling | 501 BU | 502 BU |
| Viscosity 72 hours post production | 485 BU | >1000 BU |

As the above example shows, use of the inventive non-homogeneous system with the polyethylene oxide is shown to significantly reduce the electrical load on the mixing equipment, whereas standard production of a homogeneous joint compound using the polyethylene oxide drew much more power and strain from the electrical motor. Reduced electric load and strain on electric motors used in production of joint compound lowering costs is a clear advantage in joint compound manufacture.

An additional benefit of the inventive system is evidenced in the viscosities generated post-production (see 72 hour viscosity in above chart). The data shows that a high viscosity joint compound can result using the non-homogeneous inventive system. High viscosity compounds (>750 BU viscosity) can often be desired when a low shrinkage performance is needed, such as for a spackle. Production of high viscosity compounds is difficult using traditional homogeneous production methods, subject to higher electrical motor loads and higher pump wear transporting compound through piping to a packaging fill station. The inventive system provides a route to easier, less costly production of higher viscosity compounds for the customer. It is anticipated that one might not want to use the inventive system to produce a high viscosity compound, and in those instances, the "Viscosity as Produced" would be lowered (lower than the 500 BU shown in the above example) resulting in a joint compound in the typical 72 hour viscosity of 400-600 BU, and the manufacturer would gain by even lower power consumption.

Example 2

The present system substantially reduces the excessive spongy and foamy appearance of joint compounds made with the preferred surfactant DDBSA as disclosed in U.S. Pat. No. 6,476,099 by not allowing the DDBSA additive to be uniformly distributed throughout the joint compound. Instead, a mixture of DDBSA, water and potentially other additives are injected into a small section of the matrix of the ready mix joint compound after the packaging has been filled with a DDBSA-free ready mix joint compound. By post-addition of the active ingredient as a concentrate within a small area within or under the surface of the joint compound, the vast majority of the joint compound matrix will be unaffected by the DDBSA and so will remain in a smooth creamy state preferred by applicators as they open the pail or carton.

The system is predicated on re-mixing the joint compound using the standard drill and paddle technique as is common practice by joint compound applicators. Once mixed using the drill and paddle, the DDBSA additive becomes uniformly dispersed within the joint compound, and produces the benefits of reduced shrinkage, reduced cracking, reduced surface flaws described in U.S. Pat. No. 6,476,099. Including a tint or dye in the DDBSA concentrate or any additives considered in this process would offer a visual queue that the additive was evenly disbursed in the compound.

EXAMPLE 2, TABLE 1
COMPOSITION OF NON-HOMOGENEOUS READY-MIX
JOINT COMPOUND USING SURFACTANT

| Ingredients: | Compound A, Homogeneous Blend (grams) | Compound B, Non-Homogeneous Blend (grams) |
|---|---|---|
| HUBERCARB M200 (calcium carbonate) | 1828 | 1828 |
| SILBRICO 42-23 (expanded perlite) | 45 | 45 |
| MINUGEL FG hydrous magnesium aluminum silicate (attapulgite clay) | 75 | 75 |
| METHOCEL 240S hydroxypropyl methyl cellulose (cellulosic thickener) | 10 | 10 |
| CELLOSIZE QP52000H hydroxyethyl cellulose | 3 | 3 |
| HALLTECH HP41-830 vinyl acetate emulsion (latex binder emulsion) | 65 | 65 |
| NUOSEPT 91 liquid organic biocide or MERGAL 174 liquid bactericide (preservative) | 2 | 2 |
| Water | 875 | 950 |
| WITCONATE 90 sodium dodecylbenzene sulfonate (DDBSA) | 2 (mixed with rest of ingredients) | 2 post added into the finished batch with 10 water units after manufacture) |

WITCONATE 90 sodium dodecylbenzene sulfonate is a surfactant made by Akzo Nobel Surface Chemistry LLC, Chicago, Ill.

For the above compositions, the joint compound base was made by weighing the dry components and combining them in a vessel. Water was weighed and placed into a second vessel then the remaining wet ingredients including the latex emulsion and preservatives were weighed and added to the water and dispersed. The combined dry ingredients were added to the liquids and mixed until smooth. For the present examples, the target viscosity was 500 BU. The DDBSA component in Compound A (Example 2, Table 1) was included with the rest of the dry components and added to the liquids and mixed. Compound A was then packaged and sealed. The mixing process for Compound B was the same as for Compound A except the DDBSA was withheld from the dry ingredients that were combined with the liquids during the initial mixing process. The DDBSA component in Compound B (Example 2, Table 1) was withheld and dispersed in 10 ml. of water creating a separate slurry. After completing the mixing of Compound B, the joint compound was packaged and the DDBSA slurry added into a pocket made below the surface of the compound then the container was sealed.

Because the unsightly airy, frothy and spongy appearance of the compound using uniformly dispersed DDBSA develops over time, the sample were allowed to sit undisturbed for 1 week. The joint compounds were then evaluated with test results summarized in Example 2, Table 2 below.

EXAMPLE 2, TABLE 2
PERFORMANCE DATA NON-HOMOGENEOUS READY-MIX JOINT COMPOUND USING SURFACTANT

| | Compound A Homogeneous Blend (grams) | Compound B Non-Homogeneous Blend (grams) |
|---|---|---|
| Comments on unmixed appearance at 24 hours | Very frothy, dry stiff | Heavy creamy |

-continued

EXAMPLE 2, TABLE 2
PERFORMANCE DATA NON-HOMOGENEOUS READY-
MIX JOINT COMPOUND USING SURFACTANT

|  | Compound A Homogeneous Blend (grams) | Compound B Non-Homogeneous Blend (grams) |
|---|---|---|
| Viscosity after 30 seconds hand mixer - high (Brabender Units) | 720 | 460 |
| Weight/US Gallon | 10.05 | 10.67 |
| One Week Appearance | Very frothy, dry | Smoother, wetter |
| Weight/US Gallon before mixing | 10.33 | 10.68 |
| Weight/US Gallon after mixing | 9.83 | 10.28 |
| Viscosity after 30 seconds hand mixer - high (Brabender Units) | 740 | 475 |

As the above example shows, use of the inventive non-homogeneous system using surfactant is shown to significantly improve the product appearance of ready mixed joint compound, whereas standard production of a homogeneous joint compound adding the surfactant and dispersing it within the entire batch very negatively affected the product appearance in the package. An additional advantage is the increased water demand of the non-homogeneous system using surfactant over the standard production of the same lowering per unit cost to the manufacturer. Those skilled in the art and familiar with the performance advantages of joint compounds made with the preferred surfactant DDBSA as disclosed in U.S. Pat. No. 6,476,099 recognize the disadvantage of viscosity increase over time. The inventive system significantly reduces the tendency for the lightweight joint compound to build viscosity over time. This advantage offers a more predictable product in the market.

While a particular embodiment of the ready-mix joint compound has been shown and described, it will be appreciated by those skilled in the art that changes and modifications may be made thereto without departing from the invention in its broader aspects.

We claim:

1. A wallboard joint compound, comprising:
a base joint compound comprising a homogeneous, paste-like blend of water and at least one of a filler; a binder, a thickener, a suspending agent, a biocide, a preservative, a mineral filler and expanded perlite;
an additive exclusive of—ingredients listed above and discretely added during manufacturing to said base joint compound, that remains discrete and not mixed, to be dispersed throughout said base joint compound by a user just prior to application of said wallboard joint compound;
wherein said additive is surfactant sodium dodecylbenzene sulfonate; and
wherein the base joint compound has independent utility, remains substantially reaction-free with the discretely added sodium dodecylbenzene sulfonate and so will remain in a smooth creamy state prior to user dispersal of said additive, and further experiences at least a 10% reduction in viscosity after approximately 30 seconds of mixing compared to joint compounds having the same additive homogenously added during manufacturing, wherein prior to user dispersal of said wallboard joint compound, said additive is homogeneously incorporated into said base joint compound.

2. The compound of claim 1 wherein said base joint compound and said additive are packaged in a single container.

3. The compound of claim 1 wherein said filler is at least one of calcium carbonate or calcium sulfate dihydrate, comprising approximately 50-95% of the dry weight of the composition.

4. The compound of claim 1, wherein said binder is a latex emulsion binder comprising approximately 0.5-10% of the dry weight of the composition.

5. The compound of claim 1, wherein said thickener is a cellulosic thickener comprising 0.1 to 3.0% of the dry weight of the composition.

6. The compound of claim 1, wherein said suspending agent comprises 1.0 to 10% of the dry weight of the composition.

7. The compound of claim 1, wherein said expanded perlite comprises 1.0 to 10% of the dry weight of the composition.

8. The compound of claim 1, wherein said surfactant additive is pigmented to be visually distinctive from said base joint compound.

9. The compound of claim 1, wherein said surfactant additive is formed as a separate slurry prior to discrete addition to said base joint compound.

10. The compound of claim 1, wherein said base joint compound includes a mineral filler comprising 2 to 15% of the dry weight of the composition.

11. A method of preparing a wallboard joint compound, comprising:
forming a base joint compound by combining water and a filler, a thickener and a binder;
mixing said base joint compound to form a homogeneous blend; and
discretely injecting or adding a surfactant additive into said base joint compound so that said additive upon said discrete addition is non-homogeneous, remaining non-homogenous until mixed into said base joint compound just prior to use of the wallboard joint compound, wherein said additive is sodium dodecylbenzene sulfonate;
wherein the base joint compound has independent utility, remains substantially reaction-free with the discretely added sodium dodecylbenzene sulfonate and so will remain in a smooth, creamy state prior to user dispersal of said additive, and further experiences at least a 10% reduction in viscosity after 30 seconds of mixing compared to joint compounds having the same additive homogenously added during manufacturing, wherein prior to user dispersal of said wallboard joint compound, said additive is homogeneously incorporated into said base joint compound.

12. The method of claim 11, further including pigmenting said additive to render it visually distinguishable from said base joint compound.

13. The method of claim 11, further including forming said additive as a separate slurry prior to said injecting step.

14. The method of claim 11, wherein said injecting step is performed by adding said additive into a pocket made below a surface of the base joint compound.

15. A wallboard joint compound, comprising:
a base joint compound comprising a homogeneous, paste-like blend of water and at least one of a filler; a binder, a thickener, a suspending agent, a biocide, a preservative, a mineral filler and expanded perlite;
a performance enhancing additive exclusive of ingredients listed above and being discretely added during manufacturing to said base joint compound, that remains discrete and not mixed, but instead is surrounded only by said base joint compound, wherein said base joint compound has independent utility, said additive is polyethylene oxide, said base joint compound having a creamy appearance, said additive being dispersible throughout said base joint compound by a user just prior to application of said wallboard joint compound, and further experiences at least a 10% increase in viscosity after approximately 72 hours compared to joint compounds having the same additive homogenously added during manufacturing, wherein prior to user dispersal of said wallboard joint compound, said additive is homogeneously incorporated into said base joint compound.

16. The compound of claim 15, wherein said polyethylene oxide additive comprises 0.01 to 1.0% of the dry weight of the composition, said compound having a viscosity upon formulation of said base joint compound of approximately 500 BU, and upon mixing of said additive said joint compound having a viscosity of approximately 1000 BU after 72 hours.

17. A method of preparing a wallboard joint compound, comprising:
   forming a base joint compound including a homogeneous, paste-like blend of water and at least one of a filler; a binder, a thickener, a suspending agent, a biocide, a preservative, a mineral filler and expanded perlite;
   discretely injecting or adding an additive exclusive of ingredients listed above during manufacturing to said base joint compound, said additive remains discrete and not mixed, to be dispersed throughout said base joint compound by a user just prior to application of said wallboard joint compound; and
   wherein the base joint compound has independent utility and an initial viscosity, remains substantially unaffected by the discretely added additive and so will remain in a smooth creamy state prior to user dispersal of said additive, and said additive is held in discrete, non-homogenous status for achieving at least a 10% change to said initial viscosity after 30 seconds of mixing in the case of said additive reducing viscosity, and after 72 hours in the case of said additive decreasing viscosity, after user dispersal of said additive compared to joint compounds having said additive homogenously added during manufacturing, wherein prior to user dispersal of said wallboard joint compound, said additive is homogeneously incorporated into said base joint compound.

* * * * *